United States Patent
Valasin et al.

(10) Patent No.: US 8,628,135 B2
(45) Date of Patent: Jan. 14, 2014

(54) AUTOMOTIVE VEHICLE SEAT SYSTEM

(75) Inventors: Anthony Valasin, Grosse Ile, MI (US); Radesh Vangipuram, Novi, MI (US); Richard Squires, Commerce Township, MI (US); Philip Skinner, Plymouth, MI (US); Joseph Talamonti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1453 days.

(21) Appl. No.: 11/620,186

(22) Filed: Jan. 5, 2007

(65) Prior Publication Data

US 2008/0164739 A1      Jul. 10, 2008

(51) Int. Cl.
*B60N 2/005*      (2006.01)

(52) U.S. Cl.
USPC ............... 296/65.03; 297/452.18; 248/503.1

(58) Field of Classification Search
USPC .................. 296/65.01, 65.03; 297/232, 336, 297/452.18; 248/419, 420, 424, 503.1
See application file for complete search history.

(56) References Cited

U.S. PATENT DOCUMENTS

| | | | |
|---|---|---|---|
| 3,429,613 A | 2/1969 | Rice | |
| 4,759,580 A * | 7/1988 | Berklich et al. | 296/65.03 |
| 4,773,693 A * | 9/1988 | Premji et al. | 296/65.03 |
| 4,804,226 A | 2/1989 | Schmale | |
| 4,889,389 A | 12/1989 | White | |
| 5,118,163 A | 6/1992 | Brittian et al. | |
| 5,125,711 A * | 6/1992 | Syed et al. | 296/68.1 |
| 5,318,341 A | 6/1994 | Griswold et al. | |
| 5,329,694 A | 7/1994 | Sickels et al. | |
| 5,382,083 A | 1/1995 | Fecteau et al. | |
| 5,562,322 A * | 10/1996 | Christoffel | 296/65.03 |
| 5,575,533 A | 11/1996 | Glance | |
| 5,722,139 A | 3/1998 | Ladouceur et al. | |
| 5,746,476 A | 5/1998 | Novak et al. | |
| 5,775,763 A * | 7/1998 | Glinter et al. | 296/65.03 |
| 5,839,787 A | 11/1998 | Magnuson et al. | |
| 5,868,452 A | 2/1999 | Grieger | |
| 5,913,567 A | 6/1999 | Novak et al. | |
| 6,036,252 A * | 3/2000 | Hecksel et al. | 296/65.03 |
| 6,123,388 A | 9/2000 | Vits et al. | |
| 6,283,550 B1 * | 9/2001 | Vialatte et al. | 297/335 |
| 6,375,245 B1 * | 4/2002 | Seibold et al. | 296/65.03 |
| 6,554,357 B2 | 4/2003 | Moffa | |
| 6,869,145 B2 | 3/2005 | Matsunuma | |
| 6,886,797 B2 * | 5/2005 | McCullen et al. | 248/429 |
| 7,063,389 B2 | 6/2006 | Kennedy, Sr. | |
| 7,156,469 B2 | 1/2007 | Kennedy, Sr. | |
| 7,434,862 B2 * | 10/2008 | Lutzka et al. | 296/65.03 |
| 7,674,044 B2 | 3/2010 | Matsui | |
| 2001/0001221 A1 | 5/2001 | Okazaki et al. | |
| 2002/0074819 A1 * | 6/2002 | Lee | 296/65.03 |
| 2004/0217618 A1 * | 11/2004 | LaVoie | 296/65.03 |
| 2005/0067852 A1 * | 3/2005 | Jeong | 296/65.03 |
| 2006/0290180 A1 | 12/2006 | Belair et al. | |
| 2008/0164685 A1 * | 7/2008 | Valasin et al. | 280/808 |
| 2008/0164732 A1 * | 7/2008 | Valasin et al. | 297/216.13 |

FOREIGN PATENT DOCUMENTS

WO      WO2005121614 A1      12/2005

* cited by examiner

*Primary Examiner* — Glenn Dayoan
*Assistant Examiner* — Jason S Daniels
(74) *Attorney, Agent, or Firm* — Greg P. Brown; Brooks Kushman P.C.

(57) ABSTRACT

A portion of a riser of a removable vehicle seat has a layered structure. The layered structure provides abrasion resistance and noise isolation.

16 Claims, 4 Drawing Sheets

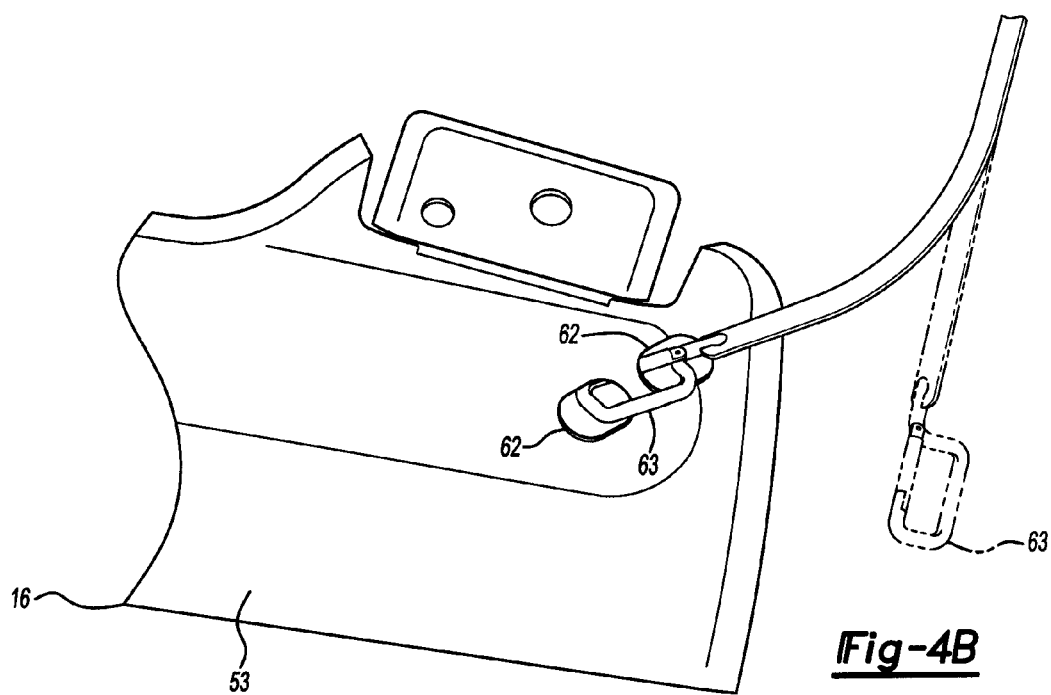
Fig-4B
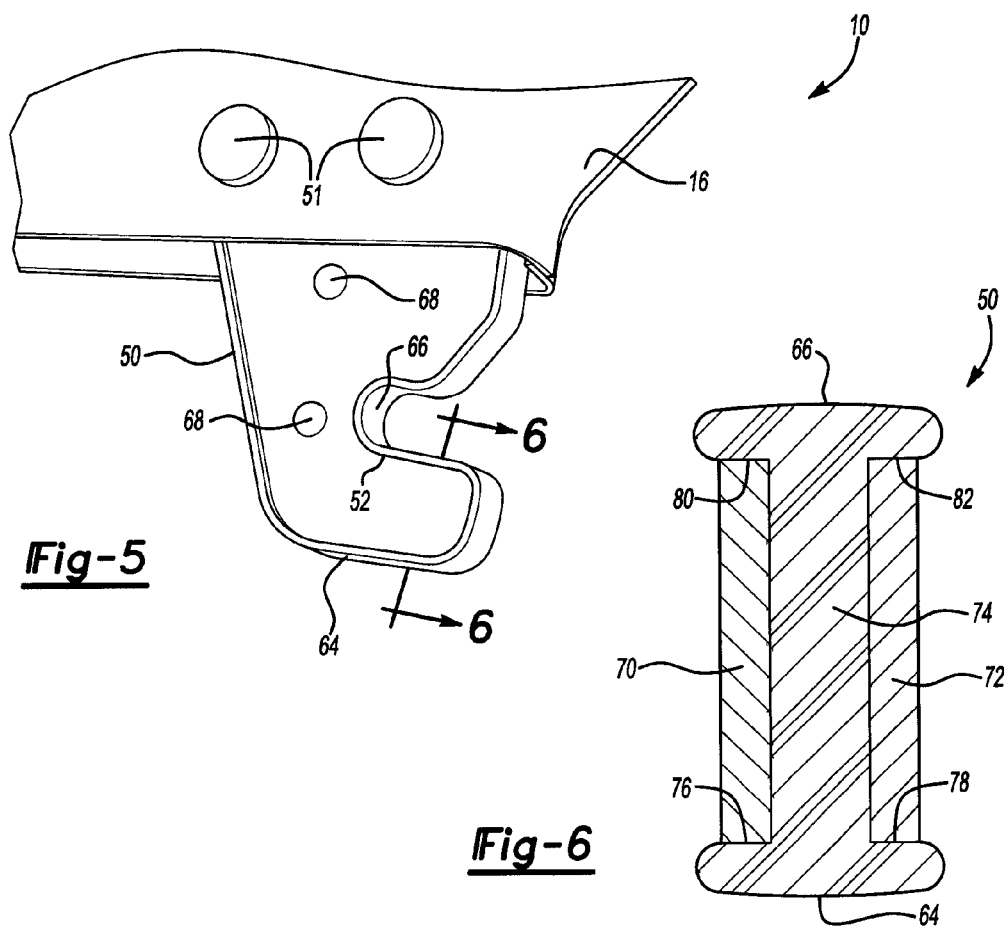
Fig-5
Fig-6

AUTOMOTIVE VEHICLE SEAT SYSTEM

BACKGROUND OF THE INVENTION

1. Field of the Invention

The invention relates to automotive vehicle seat systems.

2. Discussion

Vehicle seats may support occupants and transfer occupant loads to the vehicle. Vehicle seats generally have a seat back and a seat bottom. The seat back may support a back of an occupant and the seat bottom may support a bottom of an occupant. The seat back may include a cushion to increase the comfort of an occupant seated in the seat. Likewise, the seat bottom may include a cushion to increase the comfort of an occupant seated in the seat. Seat cushions may be covered by a fabric, or other material, to enhance the appearance of the vehicle seat.

Vehicle seats may be configured to accommodate a single occupant, e.g., a front bucket seat. Other vehicle seats may be configured to accommodate multiple occupants, e.g., a seat for a van. Additionally, different vehicles may include a different number of seats, e.g., a van may include more seats than a sports car.

Vehicle seats may take up space within a vehicle. In order to increase the space available within a vehicle, vehicle seats may be configured to be removed by a user. By unlatching and removing such removable seats from a vehicle, more space may be available for the transportation of materials. If removed, the removable seats may be stored in a garage or other storage facility. Portions of the riser/latch assemblies associated with such removable seats may be in direct contact with a ground surface of the garage or other storage facility. During storage, the removable seats may be slid across the ground surface.

While exemplary embodiments in accordance with the invention are illustrated and disclosed, such disclosure should not be construed to limit the claims. It is anticipated that various modifications and alternative designs may be made without departing from the scope of the invention.

SUMMARY

Embodiments of the invention may take the form of a removable seat for an automotive vehicle. The seat includes a riser having a sliding surface. A portion of the riser has a layered structure comprising a first metal layer having a bottom edge and a non-metal layer. The non-metal layer wraps around a portion of the bottom edge of the first metal layer to form the sliding surface.

Embodiments of the invention may take the form of a removable seat for an automotive vehicle. The seat includes a riser having a contact surface. A portion of the riser has a layered structure comprising a first metal layer having a hook edge and a non-metal layer. The non-metal layer wraps around a portion of the hook edge of the first metal layer to form the contact surface.

Embodiments of the invention may take the form of a removable seat for an automotive vehicle. The seat includes a riser having a layered structure comprising a first metal layer having an edge and a non-metal layer. The non-metal layer wraps around a portion of the edge of the first metal layer to form a protective surface for the edge of the first metal layer.

BRIEF DESCRIPTION OF THE DRAWINGS

FIG. 4B is a perspective view of a portion of the riser assembly of FIG. 4a and shows a tether strap for a child seat attached to the riser assembly.

FIG. 5 is a perspective view of a portion of the riser assembly of FIG. 4 and shows the front hook in further detail.

FIG. 6 is a rear view, in cross-section, of the front hook of FIG. 5 taken along section line 6-6 of FIG. 5 and shows the layered structure of the front hook.

DETAILED DESCRIPTION

Figure 1:
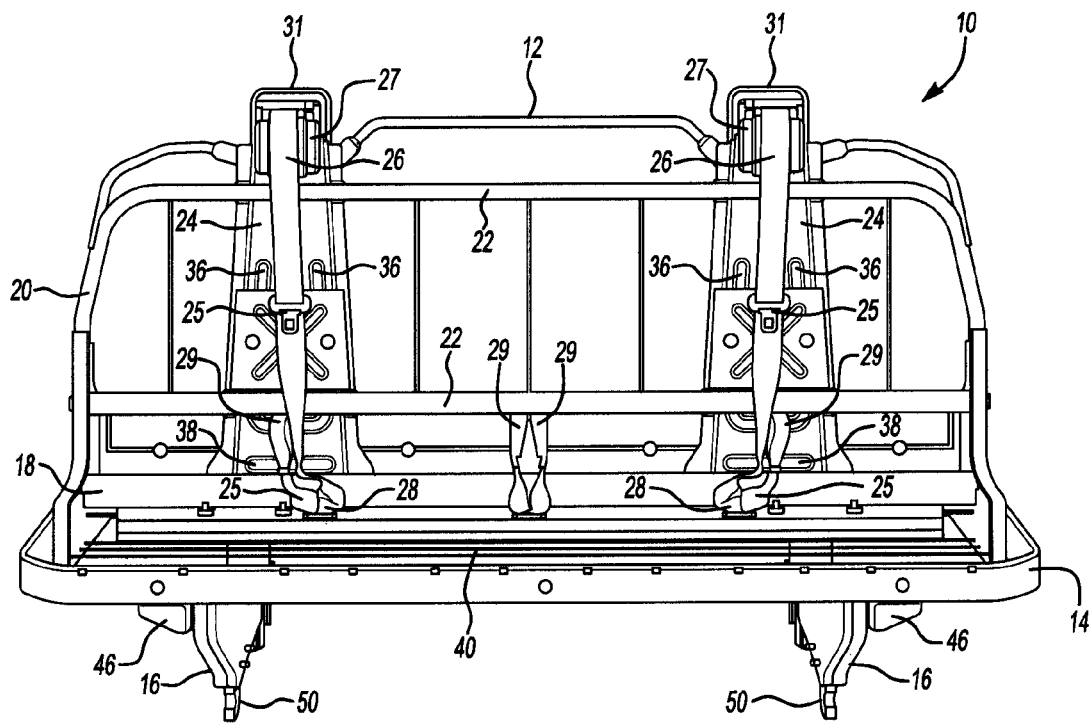
FIG. 1 is a front elevation view of a removable vehicle seat system in accordance with an embodiment of the invention and shows the under structure of the seat system.

FIG. 1 is a front elevation view of removable vehicle seat system 10 showing the under structure of seat system 10. Seat system 10 includes seat back 12, seat bottom 14, riser assemblies 16, and cross-member 18. The length of cross-member 18 is substantially equal to the width of seat system 10. In alternative embodiments, the length of cross-member 18 may be less than the width of cross-member 18. Seat system 10 can accommodate approximately four passengers. In alternative embodiments, seat system 10 can accommodate a fewer or greater number of passengers.

Seat back 12 supports a passenger back and includes back frame 20, cross tubes 22, and restraint towers 24. Back frame 20 provides structural support for a seat back cushion (not shown) and transfers/distributes passenger loads. Back frame 20 is mechanically attached, e.g., welded, bolted, with seat bottom 14 and cross-member 18. Cross tubes 22 provide further structural support for seat back 12 as well as restraint towers 24 as will be described below.

Seat system 10 also includes shoulder belts 26, retractor assemblies 27, lap belts 28, and belt buckles 29. Belts 26, 27 may limit passenger movement during vehicle impact. Retractor assemblies 27 permit shoulder belts 26 to effectively lengthen or shorten during passenger use. FIG. 1 shows shoulder belts 26 in the stowed position where a portion of shoulder belts 26 are wrapped and held within retractor assemblies 27. Shoulder belts 26 and lap belts 28 are provided with conventional latch plates 25 that are configured to be received by belt buckles 29.

Figure 2:
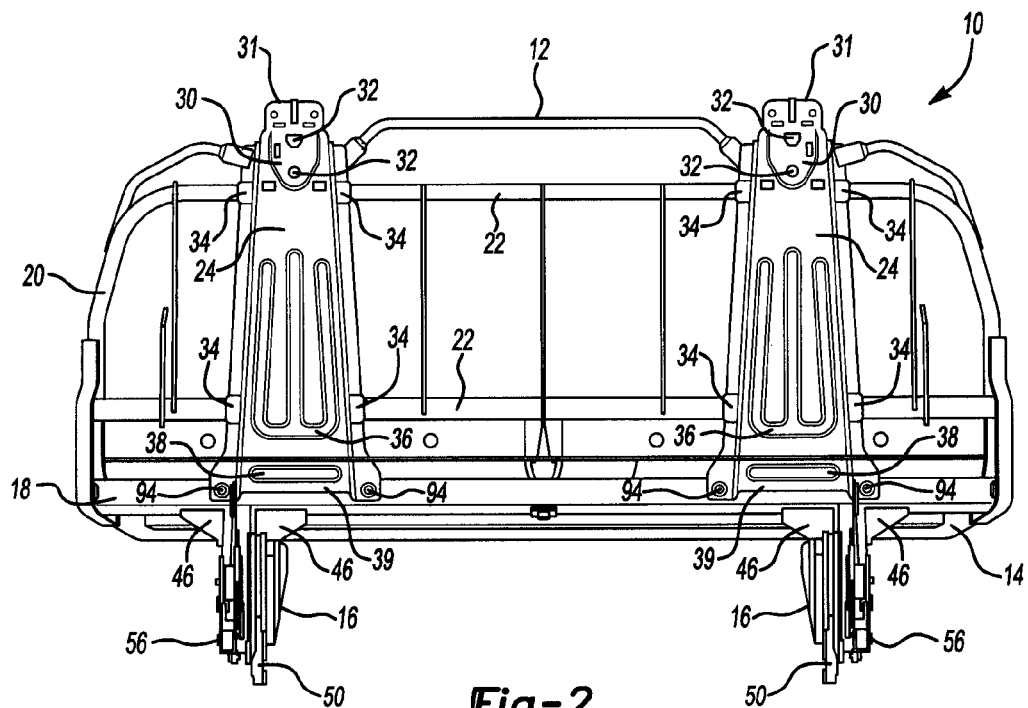
FIG. 2 is a rear elevation view of the removable vehicle seat system of FIG. 1 and shows the restraint towers in further detail.

FIG. 2 is a rear elevation view of seat system 10 of FIG. 1 showing restraint towers 24 in further detail. Restraint towers 24 include recessed areas 30 that are configured to receive retractor assemblies 27. Retractor assemblies 27 are mechanically fixed e.g., bolted to restraint towers 24 at retractor attach points 32. Restraint towers 24 further include shaped features 34 to accommodate cross tubes 22. Shaped features 34 permit cross tubes 22 to be at least partially flush with the front surface of restraint towers 24 as shown in FIG. 1. Additionally, shaped features 34 provide an extended welding surface for cross tubes 22. Restraint towers 24 further include structural features 36, 38 which further add structural integrity to restraint towers 24. Structural features 36, 38 may vary depending on the design of the seat and the loads imposed. Bases 39 of restraint towers 24 are wider than tops 31 of restraint towers 24. Additionally, restraint towers 24 taper from bases 39 to tops 31. Restraint towers 24, however, may be configured as desired.

In the embodiment of FIG. 2, cross tubes 22 are welded with restraint towers 24. Cross tubes 22, however, may be mechanically fixed with restraint towers 24 in any desired fashion or may merely be in contact with restraint towers 24. Cross tubes 22 may serve as an effective structural member that minimizes restraint tower displacement resulting in favorable passenger kinematics.

In some embodiments, restraint towers 24 are one-piece beams of uniform strength, whereby the cross sections of the structures increase proportionately with the increase in the bending moments at the sections. Such restraint towers 24 are optimized for even stress distribution, with weight and cost savings. The cross sections may also be wide flange column beams with shallow draw depths resulting in efficient packaging of passenger seating position and offering maximum seat comfort for passengers. Restraint towers 24 may be common for three and four passenger seat assemblies.

Restraint towers 24, in concert with other structural members, e.g., cross tubes 22, are designed to transfer/dissipate impact energy. Energy absorbing features, such as structural features 36, 38, enhance this ability. Restraint towers 24 may be strategically welded to cross tubes 22 to dissipate the loads through the structure in an efficient load path. Restraint towers 24 may also transfer loads to seat bottom 14. Restraint towers 24 may further be vertical, structurally optimized members.

Figure 3:
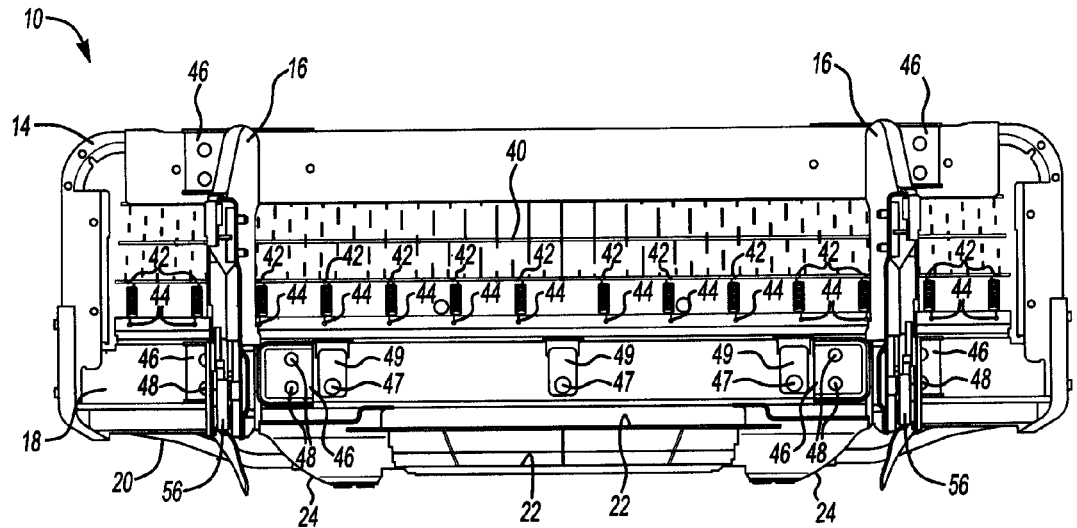
FIG. 3 is a bottom view of the removable vehicle seat system of FIG. 1 and shows the cross-member in further detail.

FIG. 3 is a bottom view of seat system 10 of FIG. 1 showing cross-member 18 in further detail. Seat bottom 14 includes support mat 40 and spring attachments 42. Support mat 40 supports/distributes passenger loads. Cross-member 18 includes support mat attach points 44, e.g., holes, configured to receive spring attachments 42 of support mat 40. Riser attach brackets 46 of riser assemblies 16 are mechanically fixed, e.g., bolted, to cross-member 18 at riser attach points 48. Belt/buckle anchor plates 49 are also mechanically fixed, e.g., bolted, to cross-member 18 at anchor plate attach points 47.

Seat system 10 provides an efficient load path management design that results in an optimized energy dissipation. Inboard passengers are restrained by the restraint systems described above which are at least partially attached to restraint towers 24. Inboard torso loads are distributed to cross-member 18 and seat bottom 14 by seat back 12 and restraint towers 24. Loads are then transferred to riser assemblies 16 and finally to the vehicle (not shown).

Figure 4A:
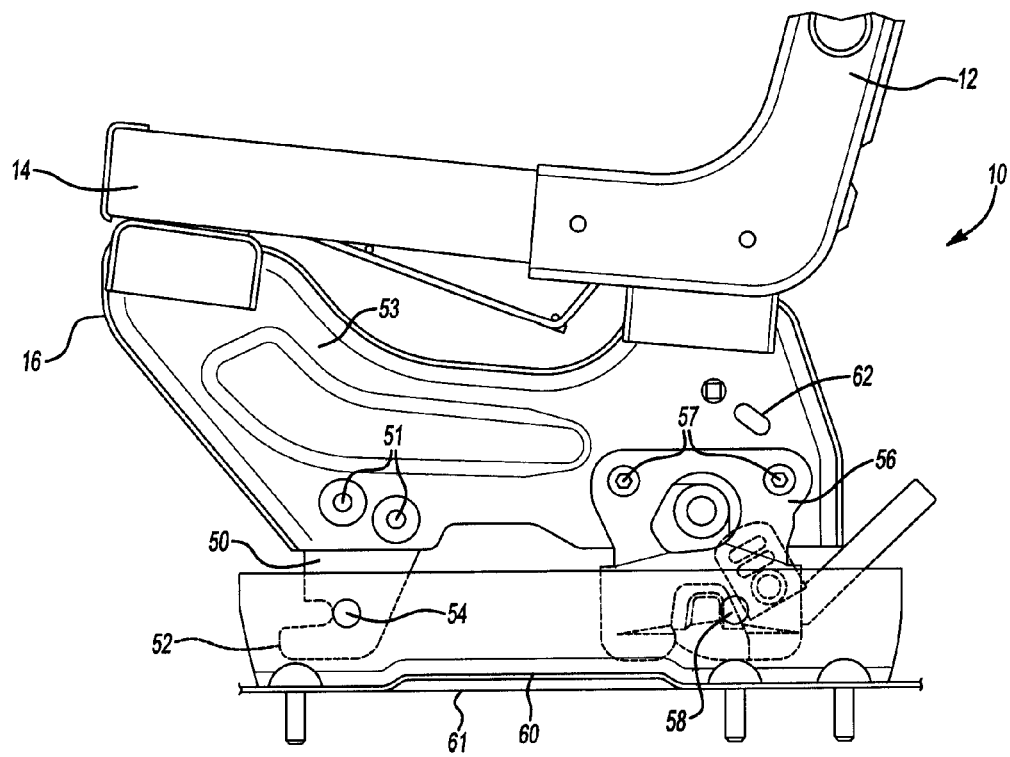
FIG. 4A is a side elevation view of a portion of seat system 10 of FIG. 1 and shows the riser assembly in further detail.

FIG. 4A is a side elevation view of a portion of seat system 10 of FIG. 1 showing riser assembly 16 in further detail. Riser assembly 16 includes front hook 50, riser plate 53, and rear latch assembly 56. Front hook 50 is mechanically fixed, e.g., bolted, to riser plate 53 at front hook attach points 51. Rear latch assembly 56 is mechanically fixed, e.g., bolted, to riser plate 53 at attach points 57.

Front hook 50 includes hook feature 52 which is configured to engage front striker 54 of the vehicle. Rear latch assembly 56, likewise, is configured to engage rear striker 58 of the vehicle. Front striker 54 and rear striker 58 are mechanically fixed, e.g., welded, to track members 60. Track members 60 may be bolted or otherwise mechanically fixed to floor pan 61 of the vehicle. Riser assembly 16 spaces seat bottom 14 away from floor pan 61.

Riser plate 53 provides child seat tether strap attach points 62 which permit tether strap 63 for a child seat to be directly attached with riser assembly 16 as shown in FIG. 4B.

FIG. 5 is a perspective view of a portion of riser assembly 16 of FIG. 4 showing front hook 50 in further detail. Front hook 50 includes skid surface 64 and striker surface 66. Skid surface 64 provides a surface on which seat system 10 may slide if removed from the vehicle. Striker surface 66 provides a contact surface for front striker 54. As described below, front hook 50 has several layers that are bolted together by bolt 68.

FIG. 6 is rear view, in cross-section, of front hook 50 taken along section line 6-6 of FIG. 5 showing its layered structure. Metal pieces 70, 72, e.g., steel, sandwich plastic core 74. Plastic core 74 wraps around bottom edges 76, 78 of metal pieces 70, 72, respectively, thus forming skid surface 64. Plastic core 74 also wraps around upper edges 80, 82 of pieces 70, 72, respectively, thus forming striker surface 66. Plastic core 74 provides abrasion resistance for bottom edges 76, 78 of front hook 50 if seat system 10 is slid or moved along skid surface 64 and noise isolation from contact with front striker 54.

In some embodiments, front hook 50 helps in proper decking of seat system 10 and also protects the structure against abrasive wear. Front hook 50 may include a high strength plastic part, e.g., plastic core 74, sandwiched between two flat steel plates, e.g., metal pieces 70, 72, riveted together to provide an efficient system that serves as a structural member. Front hook 50 may be low cost and made from simple stamping tools. Front hook 50 may be easily substituted for many of the structural hooks made from expensive processes like fine blanking.

Figure 7:
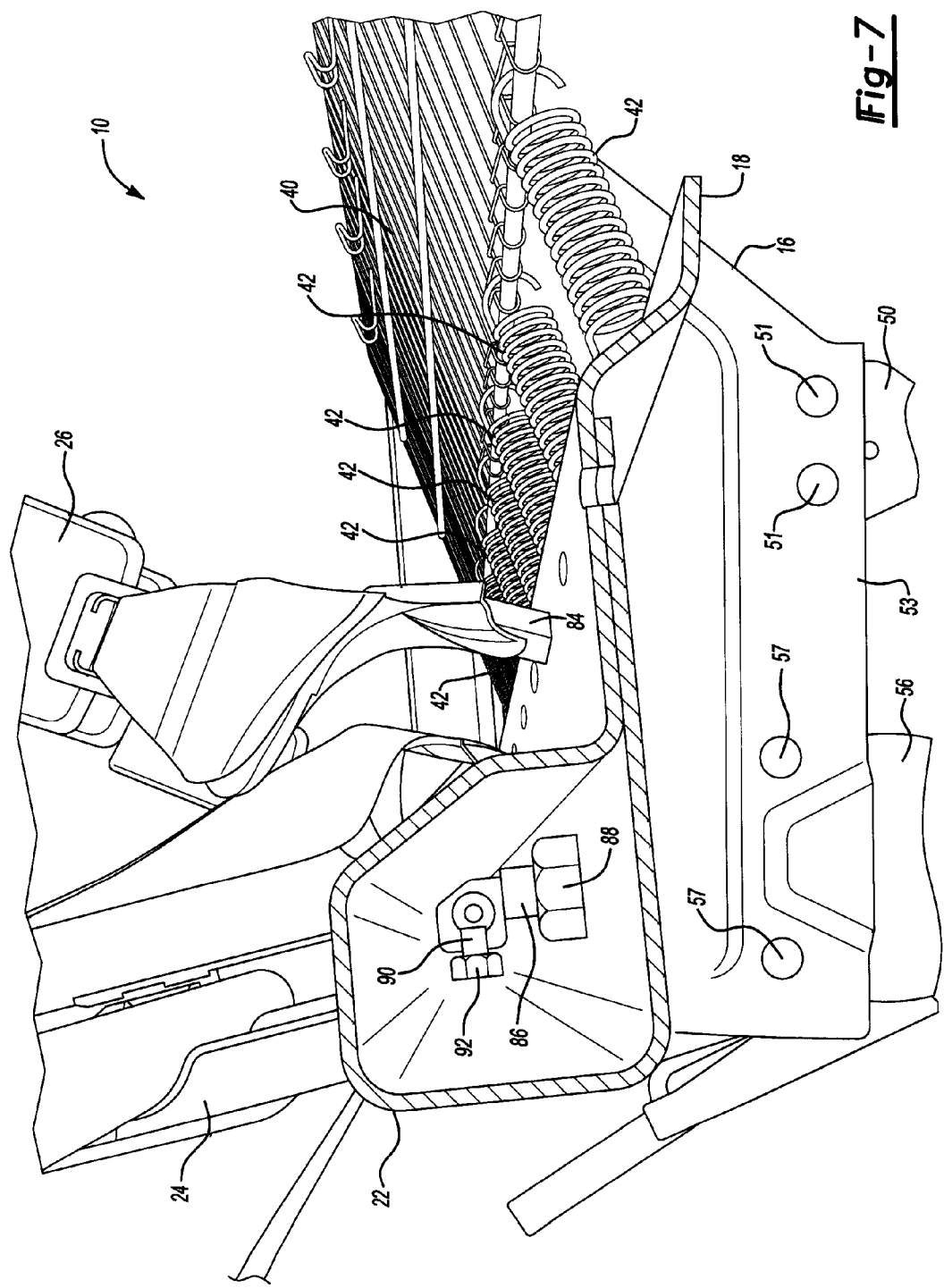
FIG. 7 is an end view, in cross-section, of a portion of seat system 10 of FIG. 1 and shows the cross-member in further detail.

FIG. 7 is an end view, in cross-section, of a portion of seat system 10 of FIG. 1 showing cross-member 18 in further detail. Cross-beam 18 transfers passenger loads from belts 26, 28 and restraint towers 24 to the vehicle through riser assemblies 16. In the embodiment of FIG. 7, cross-member 18 is roll formed. In alternative embodiments, however, cross-member 18 may have other one-piece structures.

Shoulder belt lower anchor 84 is mechanically fixed, e.g., bolted, to cross-member 18. FIG. 7 further shows riser assembly bolt 86 and riser nut 88, and restraint tower bolt 90 and restraint tower nut 92, e.g., pierce nut. Cross-member 18 thus provides features, e.g., riser attach points 48 (FIG. 2), tower attach points 94 (FIG. 2), through which bolts 86, 90 may pass. Riser assemblies 16 and restraint towers 24 are thus mechanically fixed to cross-member 18.

In some embodiments, cross-beam 18 integrates anchor plate attach points 47, tether attach points 62, and other L.A.T.C.H. attachments, trim cover attachment features, and support mat attach points 44. Cross-member 18 may includes pierce nuts embedded and dispersed throughout the section to provide the above mentioned anchor attachments.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A removable seat for an automotive vehicle including a floor pan and a striker to locate the seat relative to the floor pan, the seat comprising:
   a structural member to provide support for the seat; and
   a riser, having a sliding surface on which the seat slides if moved and a hook feature including a leading edge and a contact surface to contact the striker, attached with the structural member to space the seat away from the floor pan, wherein a portion of the riser has a layered structure including a first metal layer having a bottom edge portion, a hook edge portion, and a leading edge portion connecting the bottom and hook edge portions, a second metal layer and a non-metal layer disposed between the first and second metal layers, and wherein the non-metal layer wraps around the bottom edge portion to form the sliding surface, wraps around the hook edge portion to form the contact surface for the striker, and wraps around the leading edge portion to form a protective surface over the leading edge.

2. The seat of claim 1 wherein the second metal layer has a bottom edge portion and wherein the non-metal layer further wraps around the bottom edge portion of the second metal layer to further form the sliding surface.

3. The seat of claim 1 wherein the second metal layer comprises a steel.

4. The seat of claim 1 wherein the first metal layer comprises a steel.

5. The seat of claim 1 wherein the non-metal layer comprises a plastic.

6. The seat of claim 1 wherein the first metal layer is mechanically fixed with the non-metal layer.

7. A removable seat for an automotive vehicle including a floor pan and a striker to locate the seat relative to the floor pan, the seat comprising:
   a structural member to provide support for the seat; and
   a riser attached with the structural member to space the seat away from the floor pan and including a hook feature, having a leading edge and contact surface, to engage the striker, wherein a portion of the contact surface is in contact with the striker if the hook feature is engaged with the striker, wherein the hook feature has a layered structure including a first metal layer having a hook edge portion and a leading edge portion, a second metal layer and a non-metal layer disposed between the first and second metal layers, and wherein the non-metal layer wraps around the hook edge portion to form the contact surface and the leading edge portion to form a protective surface over the leading edge.

8. The seat of claim 7 wherein the second metal layer has a hook edge portion and wherein the non-metal layer further wraps around the hook edge portion of the second metal layer to further form the contact surface.

9. The seat of claim 7 wherein the second metal layer comprises a steel.

10. The seat of claim 7 wherein the first metal layer comprises a steel.

11. The seat of claim 7 wherein the non-metal layer comprises a plastic.

12. The seat of claim 7 wherein the riser has a sliding surface on which the seat slides if moved, wherein the first metal layer has a bottom edge portion and wherein the non-metal layer wraps around the bottom edge portion to form the sliding surface.

13. The seat of claim 7 wherein the first metal layer is mechanically fixed with the non-metal layer.

14. A removable seat for an automotive vehicle including a floor pan and a striker to locate the seat relative to the floor pan, the seat comprising:
   a structural member to provide support for the seat; and
   a riser, including a striker receiving portion configured to receive the striker, attached with the structural member to space the seat away from the floor pan, wherein the striker receiving portion has a layered structure including a first metal layer having an edge, a second metal layer and a non-metal layer disposed between the first and second metal layers, and wherein the non-metal layer wraps around a portion of the edge of the first metal layer to form a protective surface over the edge of the first metal layer.

15. The seat of claim 14 wherein the first metal layer comprises a steel.

16. The seat of claim 14 wherein the non-metal layer comprises a plastic.

\* \* \* \* \*